United States Patent
Chin

(10) Patent No.: US 6,542,190 B1
(45) Date of Patent: Apr. 1, 2003

(54) IMAGE SENSOR WITH FUNCTION OF ELECTRONIC SHUTTER

(75) Inventor: Hsu-Yuan Chin, Hsinchu (TW)

(73) Assignee: Silicon Tough Technology Inc., Hsinchu (TW)

( * ) Notice: Subject to any disclaimer, the term of this patent is extended or adjusted under 35 U.S.C. 154(b) by 0 days.

(21) Appl. No.: 09/228,948

(22) Filed: Jan. 12, 1999

(51) Int. Cl.$^7$ ............................. H04N 5/335; H04N 3/14
(52) U.S. Cl. ........................................... 348/308
(58) Field of Search ............................. 348/308, 307, 348/306, 305, 304, 303, 302, 301, 300, 294, 310, 311, 296; 250/208.1; 257/290, 291, 292, 293

(56) References Cited

U.S. PATENT DOCUMENTS

| 5,270,531 A | * | 12/1993 | Yonemoto | 250/208.1 |
|---|---|---|---|---|
| 5,296,696 A | * | 3/1994 | Uno | 250/208.1 |
| 5,335,008 A | * | 8/1994 | Hamasaki | 348/301 |
| 6,043,479 A | * | 3/2000 | Chiang | 348/308 |
| 6,317,154 B2 | * | 11/2001 | Beiley | 348/308 |
| 6,380,530 B1 | * | 4/2002 | Afghahi | 250/208.1 |

FOREIGN PATENT DOCUMENTS

JP        2000-208751      *   7/2000

* cited by examiner

*Primary Examiner*—Aung S. Moe
(74) *Attorney, Agent, or Firm*—Rosenberg, Klein & Lee

(57) ABSTRACT

An image sensor includes a plurality of pixels, each of which has a photo storage cell, a sample-and-hold switch connected with one terminal of the photo storage cell, and a reset switch connected with the other terminal of the photo storage cell. Each of the pixels of the image sensor senses light and generates charge and stores the induced charge corresponding to the generated charge by controlling the switches, so as to achieve an electronic shutter function.

13 Claims, 6 Drawing Sheets

IMAGE SENSOR WITH FUNCTION OF ELECTRONIC SHUTTER

BACKGROUND OF THE INVENTION

1. Field of the Invention

The present invention relates to an image sensor, more particularly, to an image sensor having an electronic shutter that does not use a charge coupled device (CCD).

2. Description of Related Art

Currently, there are two types of image sensors, a charge coupled device (CCD) image sensor and a MOS image sensor array.

In the CCD image sensor comprising a plurality of pixels, charges generated by sensing light of each of the pixels are transmitted to and stored in a charge coupled device (CCD), and then the stored charges are output from a terminal of the CCD in sequence. If the charges induced by the respective pixels are transmitted into the CCD simultaneously, an effect as an "electronic shutter" is achieved, so that a proper signal can be obtained at a proper time.

The MOS image sensor array does not use a CCD. With reference to FIG. 1, which shows a 4×3 image sensor array, the array comprises 12 pixels (90) arranged regularly, four word lines (93), three bit lines (94), a horizontal scanning circuit (95), a vertical scanning circuit (96), a crossing circuit (97), and an output terminal (98). Each of the pixels (90) comprises a photosensitive diode (91) and a control transistor (92). Each of the word lines (93) is connected with three pixels (90) in a row, respectively. Each of the bit lines (94) is connected with four pixels (90) in a column. The horizontal scanning circuit (95) and the vertical scanning circuit (96) respectively scan the photosensitive diodes (91) in sequence. The photosensitive diode 91 in each of the pixels (90) senses light to generate induced charges, and then the induced charges are fed to one of the corresponding bit lines (94). Then the charges induced by each of the pixels (90) are output via the output terminal (98) to an external circuit (not shown) in sequence, so that the charges can be converted into image signals.

Although the MOS image sensor array is easy to manufacture, and has the advantages of low power consumption and low cost, it cannot function as an electronic shutter as the CCD image sensor does.

The control transistor (92) of each of the pixels (90) simply transfers the charges from the photosensitive diode (91) to the corresponding bit line (94). The control transistor (92) does not store the charges. During the turn-on status of the control transistor (92) of one of the pixels (90), the control transistor. (92) transmits the charges of the photosensitive diode (91), while the other pixels (90) successively sense the variance of the external light. Accordingly, if a proper image is to be obtained, the pixels (90) have to sense light in sequence, and the induced charges in the respective pixels (90) have to be read in sequence, so that the duration for sensing light by the respective pixels 90 is identical. Therefore, the MOS image sensor array is appropriate only for a static image or a moving image varying very slowly, such as the image of a monitoring camera. That is, the conventional MOS image sensor array is not suitable for a dynamic or rapidly varying image.

SUMMARY OF THE INVENTION

One object of the present invention is to provide an improved image sensor having an electronic shutter function.

Another object of the present invention is to provide an image sensor having a simple structure without using a CCD.

In accordance with one aspect of the present invention, the image sensor comprises a plurality of pixels, each of which has a photo storage cell, a control switch connected with one terminal of the photo storage cell, and a reset switch connected with the other terminal of the photo storage cell. Each of the pixels of the image sensor controls the switches to sense light to induce charges and store the induced charges. Accordingly, the image sensor can achieve an electronic shutter effect.

In accordance with another aspect of the present invention, the photo storage cell of each pixel of the image sensor comprises an upper layer, which is an electrode plate, and a lower layer, which is made of silicon.

In accordance with another aspect of the present invention, the electrode plate layer of the photo storage cell is connected to a bit line via a sample-and-hold switch, while the silicon layer thereof is connected to a reference voltage via a reset switch. Operation of the photo storage cell is controlled by the two switches, so that the photo storage cell can perform operations such as resetting, light sensing, charge storing and charge reading, in sequence.

In accordance with still another aspect of the present invention, the photo storage cell of each pixel of the image sensor is a MOS transistor with a transparent gate.

In accordance with still another aspect of the present invention, the photo storage cell is an NMOS or a PMOS transistor with a transparent gate.

In accordance with still another aspect of the present invention, the photo storage cell comprises a photosensitive diode and a capacitor connected with each other in series.

In accordance with still another aspect of the present invention, the photo storage cell comprises a photosensitive diode and another diode connected with each other in series.

Other objects, advantages and novel features of the invention will become more apparent from the following detailed description when taken in conjunction with the accompanying drawings.

DETAILED DESCRIPTION OF PREFERRED EMBODIMENT

Figure 1:
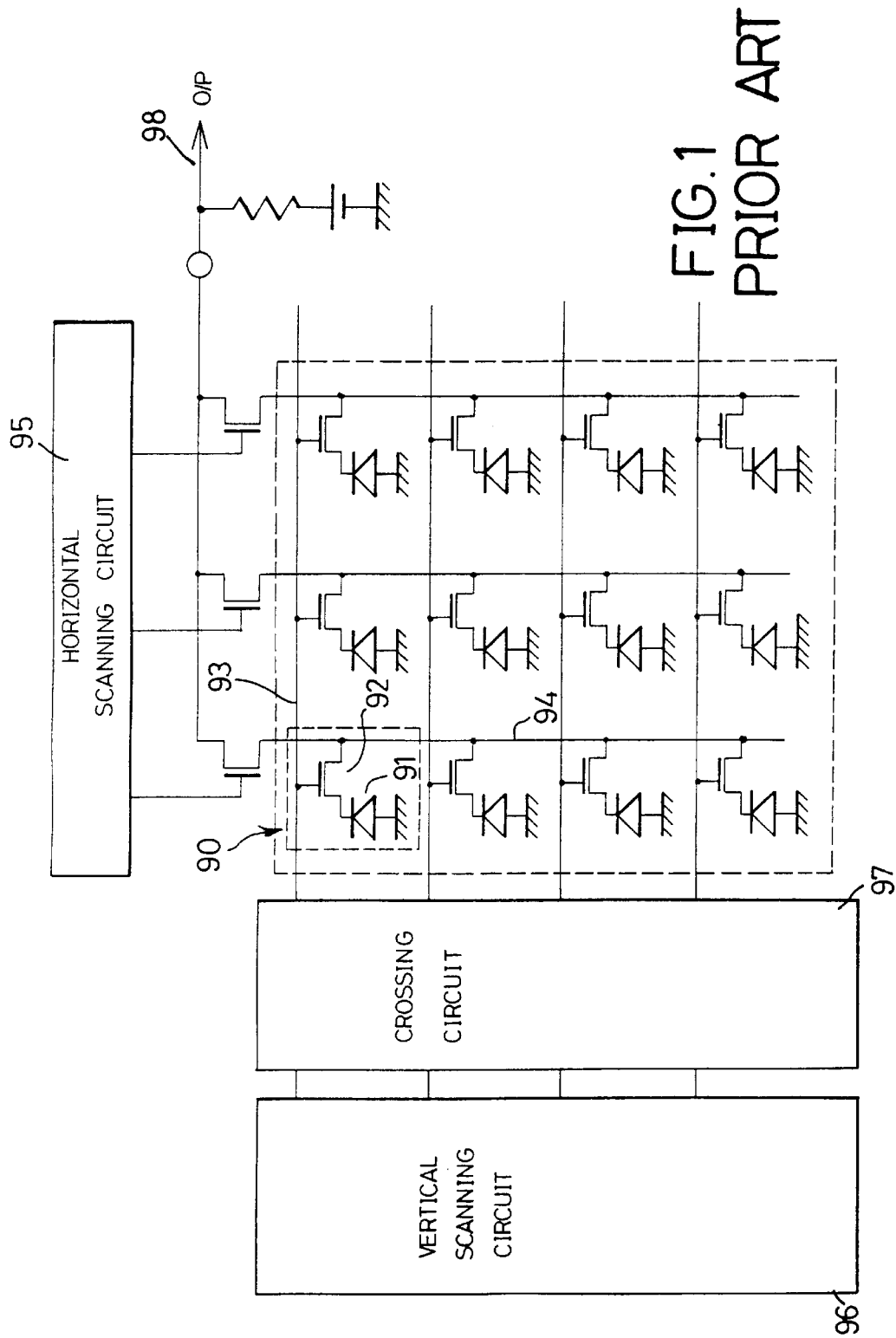
FIG. 1 shows a structure of a conventional MOS image sensor array.

The structure of an image sensor in accordance with the present invention is similar to that of the conventional MOS image sensor array as shown in FIG. 1. However, a pixel of the image sensor in accordance with the present invention is quite different from that of the prior art.

Figure 2A:
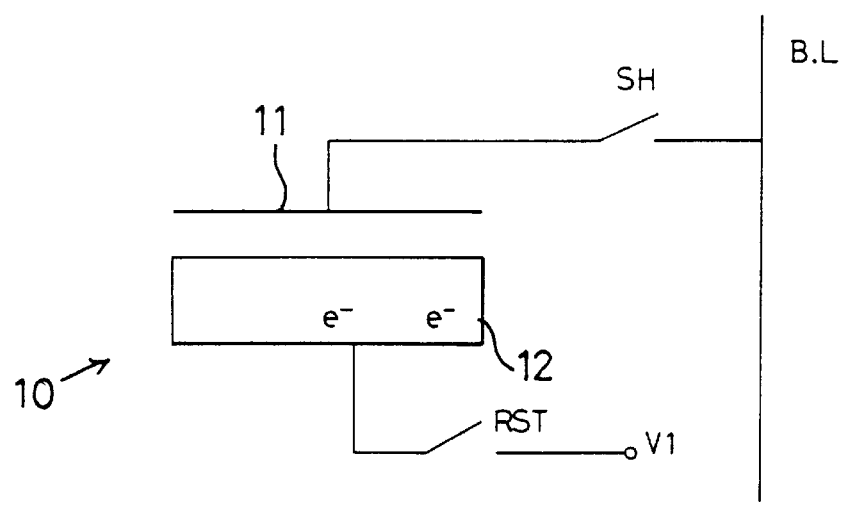
FIG. 2A shows a pixel of an image sensor in accordance with the present invention.

With reference to FIG. 2A, a pixel used in the image sensor in accordance with the present invention comprises a photo storage cell (10), a sample-and-hold switch (SH) as a control switch, and a reset switch (RST). The photo storage cell (10) comprises an upper layer (11), which is an electrode plate, and a lower layer (12), which is made of silicon. The upper layer (11) and the lower layer (12) are separated from each other by a proper space. The upper layer (11) is made of conductive material, preferably, transparent. When external light irradiates the lower layer (12), the lower layer (12) senses the light and induces charges (e−). The lower layer (12) is connected to a reference voltage (V1) via the reset switch RST. The upper layer (11) is connected to a bit line (B.L.) of the image sensor. Operations of the pixel such as resetting, sensing, charge storing and charge outputting can be performed in sequence by controlling the ON/OFF of the respective switches (SH, RST).

Figure 2B:
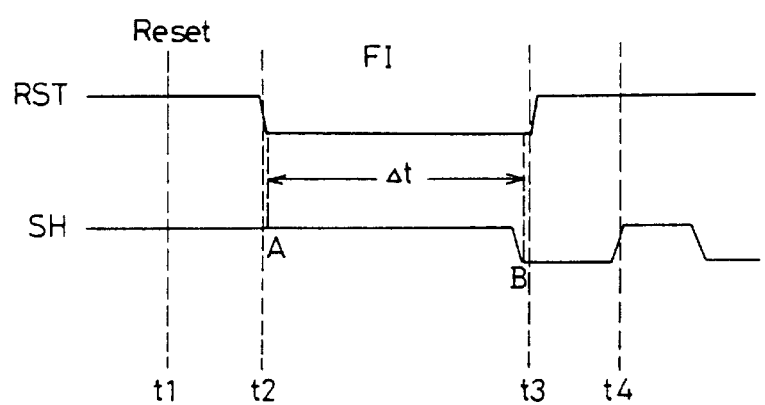
FIG. 2B is a timing chart of switch operations of the pixel in FIG. 2A.

FIG. 2B illustrates the operations of the two switches (SH, RST). At the time t1, when the two switches (SH, RST) are both closed (high level), a voltage V2 is sent from the bit line (B.L.). Accordingly, the two terminals of the photo storage cell (10) discharge to the levels V2 and V1, respectively, so that the photo storage cell (10) is reset. After the discharging operation, at the time t2, the reset switch (RST) is opened, so that the lower layer (12) of the photo storage cell (10) is floating. The floating lower layer (12) senses light and generates photoelectrons (e−). In the meantime, positive charges are induced in the upper layer (11) in correspondence to the photoelectrons (negative charges) (e−) in the lower layer (12). This stage is well known as "frame integration" (referred to as "FI" in the drawings). At the time t3, the reset switch (RST) is closed again, so that the lower layer (12) is connected to the reference voltage (V1), while the sample-and-hold switch (SH) is open, so that the upper layer (11) is floating. Accordingly, the induced positive charges are stored in the upper layer (11). Finally, at the time t4, the sample-and-hold switch (SH) is closed again, so that the stored positive charges are output to the bit line (B.L.).

At the time t3, positive charges corresponding to the photoelectrons (e−) of the lower layer (12) are stored in the upper layer 11 by capacitive coupling. In addition, the lower layer 12 is connected to the reference voltage V1. Even if the external light continuously illuminates the lower layer 12, any additional photoelectrons generated will be absorbed by the reference voltage V1. That is, the lower layer 12 is turned "OFF" such that no further charges will be accumulated. Accordingly, the phenomenon of "over sensitization" is avoided.

The duration of sensitization is determined by Δt in FIG. 2B. The photo storage cell 10 senses light only in the duration Δt. However, at all other times, it is in the "OFF" state such that no charges are accumulated. Since the induced charges have been stored in the upper layer 11, the charges will not escape. Accordingly, the electronic shutter function can be provided by the structure described.

Figure 3:
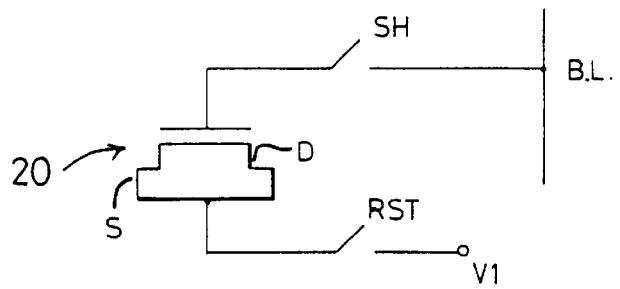
FIG. 3 shows a pixel of the image sensor of another embodiment in accordance with the present invention.

In another embodiment of the present invention, the upper layer 11 of the photo storage cell 10 is replaced by a polysilicon gate structure, and the lower layer 11 is a silicon substrate of a MOS transistor. Accordingly, with reference to FIG. 3, the pixel has a photo storage cell 20, which is a MOS transistor. The photo storage cell 20 can be an NMOS transistor or a PMOS transistor. A gate of the MOS transistor 20 is connected to the bit line B.L. via the sample-and-hold switch SH. A source S and a drain D of the MOS transistor 20 are short-circuited to form an electrode contact connected to the reference voltage V1 via the reset switch RST.

Figure 4:
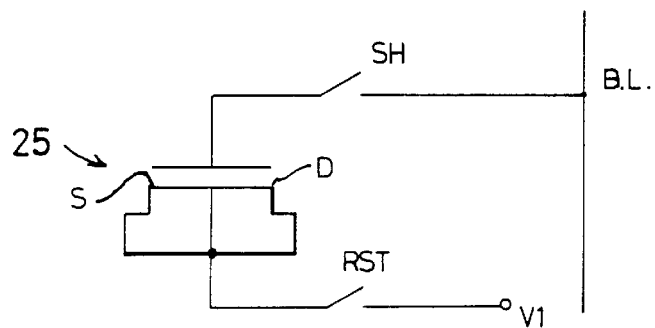
FIG. 4 shows a pixel of the image sensor of another embodiment in accordance with the present invention.

Alternatively as shown in FIG. 4, a pixel of the image sensor in according with another embodiment of the present invention comprises a MOS transistor 25. A source and a drain of the MOS transistor 25 are also short-circuited to form an electrode contact. The electrode contact is further connected to a substrate of the MOS transistor 25.

Figure 5:
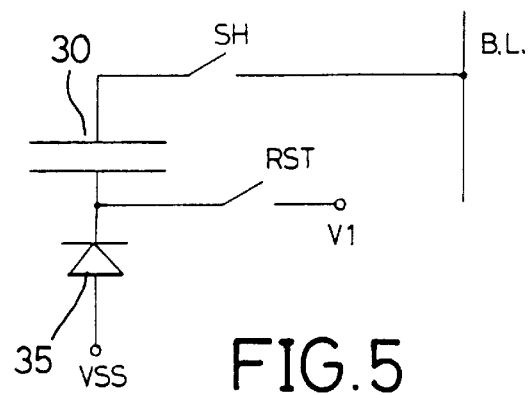
FIG. 5 shows a pixel of the image sensor of still another embodiment in accordance with the present invention.

With reference to FIG. 5, a pixel of the image sensor of still another embodiment in accordance with the present invention comprises a capacitor 30 and a photodiode 35 connected in series. A junction between one terminal of the capacitor 30 and the cathode of the photodiode 35 is connected to the reference voltage V1 via the reset switch RST. An anode of the photodiode 35 is connected to a voltage VSS. The other terminal of the capacitor 30 is connected to the bit line B.L. via the sample-and-hold switch SH.

Figure 6:
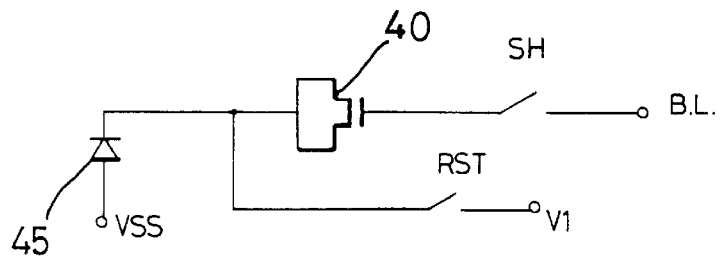
FIG. 6 shows a pixel of the image sensor of still another embodiment in accordance with the present invention.

With reference to FIG. 6, a pixel of the image sensor of still another embodiment in accordance with the present invention comprises a MOS transistor 40 and a photodiode 45 connected in series. The gate of the MOS transistor 40 is connected to the bit line B.L. via the sample-and-hold switch SH. The source and the drain of the MOS transistor 40 are short-circuited to form a contact, which is connected to the reference voltage V1 and the cathode of the photodiode 45. The anode of the photodiode 45 is connected to the voltage VSS.

Figure 7:
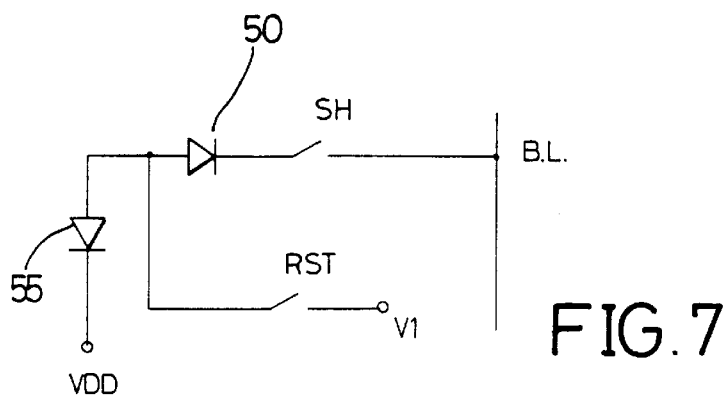
FIG. 7 shows a pixel of the image sensor of still another embodiment in accordance with the present invention.

With reference to FIG. 7, a pixel of the image sensor of still another embodiment in accordance with the present invention comprises a diode 50 and a photodiode 55 inversely connected with each other in series. The anode of the diode 50 and the anode of the photodiode 55 are connected together and to the reference voltage V1 via the reset switch RST. The cathode of the diode 50 is connected to the bit line B.L. via the sample-and-hold switch SH. The cathode of the photodiode 55 is connected to a voltage VDD.

Figure 8:
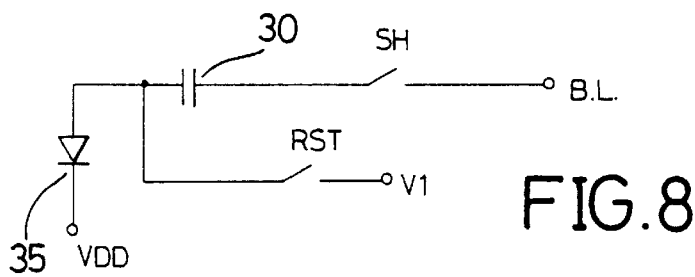
FIG. 8 shows a pixel of the image sensor of still another embodiment in accordance with the present invention.

With reference to FIG. 8, a pixel of the image sensor of still another embodiment in accordance with the present invention as shown is similar to that of FIG. 5. The only difference is that the photodiode 35 is inversely connected with the capacitor 30. That is, the anode of the photodiode 35 is connected with one terminal of the capacitor 30 to form a connection to the reset switch RST. The cathode of the photodiode 35 is connected to the voltage VDD.

Figure 9:
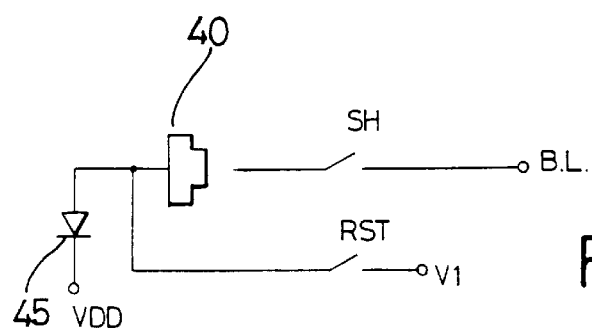
FIG. 9 shows a pixel of the image sensor of still another embodiment in accordance with the present invention.

With reference to FIG. 9, a pixel of the image sensor of still another embodiment in accordance with the present invention as shown is similar to that of FIG. 6, the only difference is that the photodiode 45 is inversely connected with the MOS transistor 40. That is, the anode of the photodiode 45 is connected to the contact of the MOS transistor 40 and to the reset switch RST, while the cathode is connected to the voltage VDD.

Figure 10A:
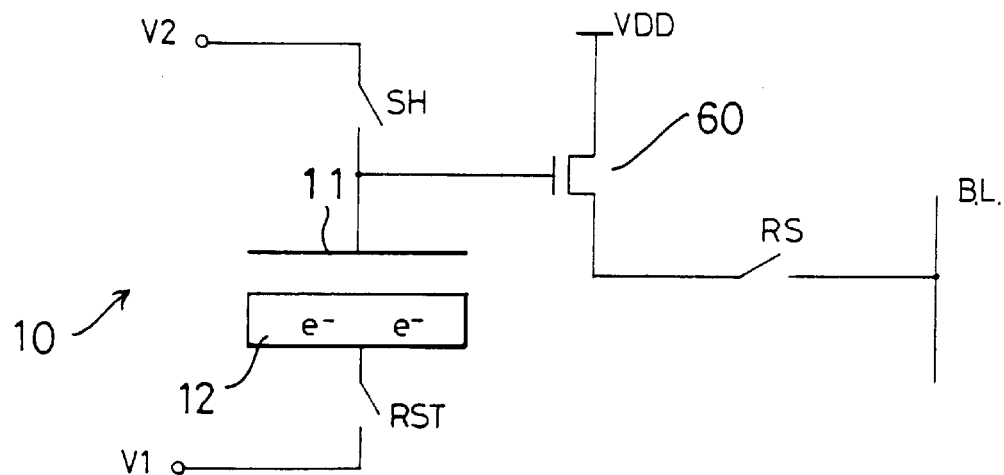
FIG. 10A shows a pixel of the image sensor of still another embodiment in accordance with the present invention.

With reference to FIG. 10A, the structure of a pixel as shown is similar to that of FIG. 2A, except an additional amplifying transistor 60 is provided to connect between the upper layer 11 and the sample-and-hold switch SH. The photo storage cell 10 is connected to the voltage V2 via the sample-and-hold switch SH, and is connected to the bit line via the amplifying transistor 60. The image sensor, which comprises a plurality of pixels constructed as shown in FIG. 10A, is an active image sensor. A voltage signal or a current signal is read via the bit line (B.L.). The operation of the pixel switches in FIG. 10A is shown in FIG. 10B.

In practice, the pixel in FIG. 2A or FIG. 10A may have a nonlinear effect. An equivalent circuit is shown as the left portion of FIG. 11A. The nonlinear effect is represented by an equivalent diode D1 connected with the lower layer 12 of the photo storage cell 10. The equivalent diode D1 acts as a variable capacitor having a capacitance $C_{D1}$, which varies with the voltage of the diode. The nonlinear effect may cause signal reading errors. To solve this problem, a correcting circuit 80 is added as shown in the right portion of FIG. 11A. The correcting circuit 80 comprises two operational amplifiers 81 and 82, two switches φ1 and φ2, a compensation diode $D_{ec}$ and three capacitors C1, C2 and C3.

Figure 10B:
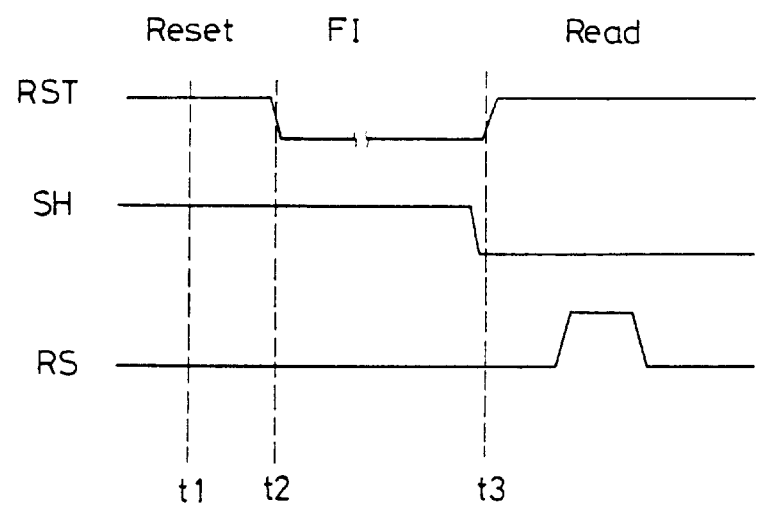
FIG. 10B is a timing chart of operations of the pixel in FIG. 10A.

With reference to FIG. 10B, Δt1 denotes a duration of "pixel reset", Δt2 denotes a duration of "pixel sensitization", Δt3 denoted a duration of "charge storing" Δt4 denotes a duration of "charge reading", and Δt5 denotes a duration of "output correction". The operation of pixels is similar to that described with reference to FIG. 2B.

The operational amplifier 81 the switch φ1 and the capacitor C1 compose a signal reading loop. As shown in FIG. 11B, the switch φ1 is opened only during the charging reading period (Δt4), while being closed at other times, so that the upper layer 11 of the photo storage cell 10 is maintained at the level of V2. When the switch φ1 is opened, the charge (QCm) in the photo storage cell 10 is transferred to the capacitor C1 to generate an output voltage Vy. The correction is mainly effected by the compensating diode $D_{ec}$.

Storage capacitance of the photo storage cell 10 is Cm. The circuit is designed so that the capacitance of the capacitor C1 and the capacitance of the capacitor C2 are both equal to the storage capacitance of the photo storage cell 10, that is, Cm=C1=C2. In addition, the compensation diode $D_{ec}$ is selected so that the equivalent capacitance thereof ($C_{Dec}$) is equal to the equivalent capacitance $C_{D1}$ of the equivalent diode D1. If a terminal voltage for the diode $D_{ec}$ is set to be equal to the terminal voltage for the diode D1, the signal error due to the nonlinear effect can be compensated.

Figure 11A:
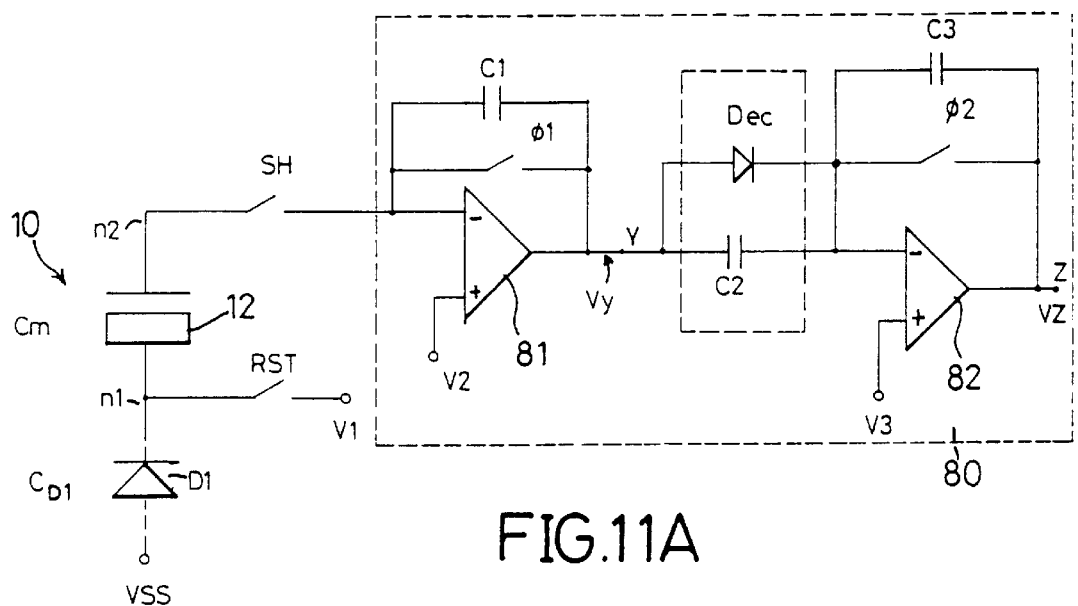
FIG. 11A shows a pixel of the image sensor of still another embodiment in accordance with the present invention.
Figure 11B:
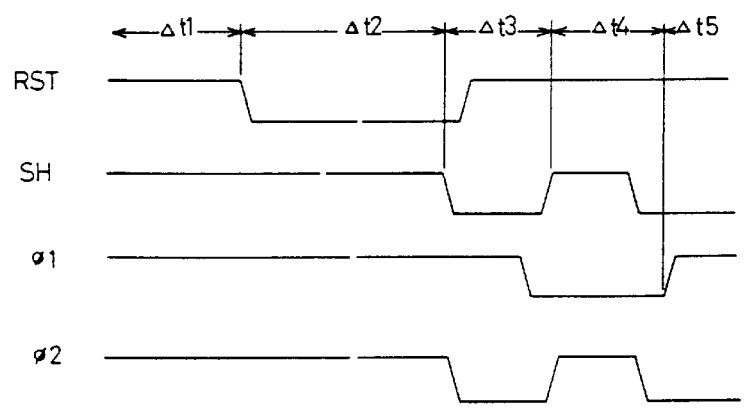
FIG. 11B is a timing chart of operations of the pixel in FIG. 11A.

Assuming all of the operational amplifiers (81, 82) and switches (SH, RST, φ1 φ2) in the circuit shown in FIG. 11A are ideal, the principle of the operation of the correction circuit 80 is described as follows.

With reference to FIG. 11B, in the period Δt1, the reset switch RST is closed, so as to be connected to the reference voltage V1. Accordingly, the voltage level $V_{n1}$ of a node n1, which is connected between the lower layer 12 of the photo storage cell 10 and the reset switch RST, is equal to V1, that is $V_{n1}$=V1. In the period Δt2, the reset switch RST is opened, so that the node n1 is floating. The voltage level $V_{n1}$ becomes $V_x$, that is $V_{n1}$=$V_x$. The quantity of the charge at the node n1 $Q_{n1}$ is:

$$Q_{n1}=(V_x-V1)(C_{D1}+Cm) \quad (1)$$

At the end of the charge storage period (Δt3), the charge QCm stored in the storage capacitor Cm of the photo storage cell 10 is:

$$QCm=Q_{n1}(Cm/(C_{D1}+Cm)) \quad (2)$$

Since C1=Cm, the voltage level Vy at a node Y, which is an output terminal of the signal reading loop, is:

$$Vy=(Q_{n1}/(C_{D1}+Cm))+V2 \quad (3)$$

In equation (3), the equivalent capacitance $C_{D1}$ varies with the bias voltage applied to the PN junction of the diode D1. Therefore, the relationship between the variance of Vy and Qn1 is nonlinear when the voltage $V_{n1}$ varies. The equivalent capacitance $C_{Dec}$ is selected to be equal to the equivalent capacitance $C_{D1}$, and the terminal voltage of the compensating diode $D_{ec}$ (V3−V2) is set to be equal to the terminal voltage of the equivalent diode D1 (V1−VSS). Accordingly, in the period Δt4, the correction charge $Q_{cor}$ to the charges in the diode $D_{ec}$ and the capacitor C2 is:

$$\begin{aligned}Q_{cor} &= (Vy - V3)(C2 + C_{Dec}) \\ &= (Q_{n1}/(C_{D1} + Cm))(C2 + C_{Dec}) \\ &= Q_{n1}\end{aligned}$$

At this time, the resultant correction output voltage Vz is:

$$Vz=(Q_{n1}/C3)+V3$$

Since C3 and V3 are constants, the relationship between the variance of the output voltage Vz and the amount of the charges $Q_{n1}$ at node n1 is linear. Accordingly, the errors due to the equivalent diode D1 can be corrected.

It is to be understood that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. An image sensor comprising an array of pixels arranged in columns and rows, a plurality of word lines each connected to the respective pixels in a column, a plurality of bit lines each connected to the respective pixels in a row, a horizontal scanning circuit, a vertical scanning circuit for scanning the respective pixels, and each of said pixels comprising:

a photo storage cell having a lower layer for sensing light to generate and accumulate charge, and an upper layer for inducing charge corresponding to said charge generated in the lower layer and for storing said induced charge;

a sample-and-hold switch connected to said upper layer of the photo storage cell and for outputting said induced charges; and a reset switch connected between said lower layer of the photo storage cell and a reference voltage;

said reset and the sample-and-hold switches being closed firstly to reset the photo storage cell, then the reset switch being opened so that the lower layer of the photo storage cell is floating to sense light and generate charge, and then a corresponding charge is induced in the upper layer, the reset switch being closed again and the sample-and-hold switch being opened so that upper layer is floating to store said induced charge, and, finally, the sample-and-hold switch being closed again to output the stored charge.

2. The image sensor as claimed in claim 1, wherein said upper layer of the photo storage cell is made of conductive material.

3. The image sensor as claimed in claim 2, wherein said upper layer of the photo storage cell is transparent.

4. The image sensor as claimed in claim 3, wherein said upper layer of the photo storage cell is made of polysilicon.

5. The image sensor as claimed in claim 2, wherein said upper layer of the photo storage cell is made of polysilicon.

6. The image sensor as claimed in claim 1, wherein said photo storage cell is a MOS transistor having a gate thereof as the upper layer and a silicon substrate thereof as the lower layer.

7. The image sensor as claimed in claim 6, wherein the source and the drain of said MOS transistor are connected together to form an electrode contact of the lower layer.

8. The image sensor as claimed in claim 6, wherein the source and the drain of said MOS transistor are connected with said substrate thereof to form an electrode contact of the lower layer.

9. The image sensor as claimed in claim 1, wherein said photo storage cell is composed of a capacitor and a photodiode connected with each other in series.

10. The image sensor as claimed in claim 1, wherein said photo storage cell is composed of a MOS transistor and a photodiode connected with each other in series.

11. The image sensor as claimed in claim 1, wherein said photo storage cell is composed of a diode and a photodiode connected with each other in series.

12. The image sensor as claimed in claim 1 further comprising an amplifying transistor connected between the photo storage cell and the sample-and-hold switch.

13. The image sensor as claimed in claim 1 further comprising a compensating diode connected to the sample-and-hold switch, said compensating diode has capacitance and terminal voltage equal to equivalent capacitance and terminal voltage of the photo storage cell, respectively.

* * * * *

UNITED STATES PATENT AND TRADEMARK OFFICE
CERTIFICATE OF CORRECTION

| | | |
|---|---|---|
| PATENT NO. | : 6,542,190 B1 | Page 1 of 1 |
| APPLICATION NO. | : 09/228948 | |
| DATED | : April 1, 2003 | |
| INVENTOR(S) | : Hsu-Yuan Chin | |

It is certified that error appears in the above-identified patent and that said Letters Patent is hereby corrected as shown below:

DELETE THE ASSIGNEE NAME "SILICON TOUGH TECHNOLOGY INC."
    IN BLOCK [73] ON THE TITLE PAGE AND INSERT --SILICON TOUCH
    TECHNOLOGY INC.--

Signed and Sealed this
Twenty-sixth Day of February, 2013

Teresa Stanek Rea
*Acting Director of the United States Patent and Trademark Office*